United States Patent [19]

Nanba et al.

[11] 3,938,893

[45] Feb. 17, 1976

[54] IMAGE FOCUSSING MECHANISM

[75] Inventors: Yasuhiro Nanba; Seiji Yamada, both of Sakai; Motonobu Matsuda, Isumi, all of Japan

[73] Assignee: Minolta Camera Kabushiki Kaisha, Osaka, Japan

[22] Filed: Nov. 4, 1974

[21] Appl. No.: 520,510

[30] Foreign Application Priority Data

Nov. 9, 1973 Japan.............................. 48-126648

[52] U.S. Cl. .................... 356/125; 250/201; 354/25
[51] Int. Cl.²........................................... G01B 9/00
[58] Field of Search ........ 356/125; 354/25; 250/201

[56] References Cited
UNITED STATES PATENTS 3,833,806  9/1974  Sato .................................. 250/201

*Primary Examiner*—R. V. Rolinec
*Assistant Examiner*—Darwin R. Hostetter
*Attorney, Agent, or Firm*—Wolder & Gross

[57] ABSTRACT

A mechanism for determining the focus by an objective lens of an image on a focal plane includes a needle shaped or other narrow scanning mask transversely oscillated in the focal plane between the lens and a transversely extending photoelectric element exposed to the mask intercepted image. The output of the photosensitive element is coupled by way of a high pass filter or differentiating circuit and a rectifier to a meter, the maximum meter reading indicating maximum AC output and hence maximum focus. The output of the photosensitive element is also connected through a low-pass filter to a meter or exposed control mechanism.

8 Claims, 2 Drawing Figures

IMAGE FOCUSSING MECHANISM

BACKGROUND OF THE INVENTION

The present invention relates generally to improvements in image focussing mechanism, and it relates more particularly to an improved mechanism for determining the focus of an image by an objective lens on a predetermined focal plane, and to the combination therewith of a through the lens light measuring system.

A mechanism has heretofore been proposed for detecting the focussed condition of an image formed by an objective lens on a focal plane in which an image is scanned to obtain a video signal and the video signal is then differentiated or passed through a high-pass filter to derive a high frequency component indicative of the focus based on the phenomenon that a sharp image contrast results when proper focussing is effected. To this end, a scanner having a slit or pin hole is oscillated or rotated in a direction parallel to the image plane in the vicinity of the image focussing plane of a lens, and a video signal is thus obtained or produced by a photoelectric element placed in the rear of the scanning slit or pin hole. However, the aforesaid type of mechanism possesses important drawbacks in that there is provided as a scanner a plate having a sufficient area to shield the photoelectric element throughout the course of its oscillation or rotation, the size of the device including the drive source is large and bulky, with a resulting large energy consumption and the mechanism otherwise leaves much to be desired.

SUMMARY OF THE INVENTION

It is a principal object of the present invention to provide an improved focus sensing mechanism.

Another object of the present invention is to provide an improved mechanism for determining the focussed condition of an image on a focal plane by an objective lens.

Still another object of the present invention is to provide an improved combined image focus determining mechanism and through the lens light measuring system.

A further object of the present invention is to provide a improved mechanism for determining the focussed condition of an image in which an oscillating mask in the focal plane is employed to produce an AC signal indicative of such focussed condition.

Still a further object of the present invention is to provide a mechanism of the above nature characterized by its reliability, simplicity, compactness, low bulk, low energy consumption and high versatility and adaptability.

The above and other objects of the present invention will become apparent from a reading of the following description taken in conjunction with the accompanying drawings which illustrate a preferred embodiment thereof.

In a sense, the present invention contemplates the provision of a mechanism for determining the focus condition of an image by an objective lens on a focal plane, comprising a masking element movable in the focal plane, means for repeatedly moving the masking element across a scan area delineating at least part of the image in the focal plane, the masking element having a width less than that of the scan area, a photoelectric image disposed behind the masking element and exposed to the image in the scan area and means responsive to an electrical parameter of the photoelectric element which varies with the scanning by the masking element as an indication of the focus condition. In the preferred mechanism the masking element is in the form of a needle or elongated vane which is transversely oscillated in the focal plane. The photoelectric element includes a transversely extending photosensitive section proximate and parallel to the focal plane transversed by the masking element and connected to the inputs of a low-pass filter and a high-pass filter or differentiating network, the output of the high-pass filter or differentiating network being rectified and applied to a first current meter and the DC output of the low-pass filter being applied to a second current meter. The first meter indicates the focus condition of the image on the focal plane and the second meter indicates the amount of incident TTL light.

The improved mechanism is simple, compact, reliable and consumes a minimum of electrical current.

DESCRIPTION OF THE PREFERRED EMBODIMENT

Figure 1:
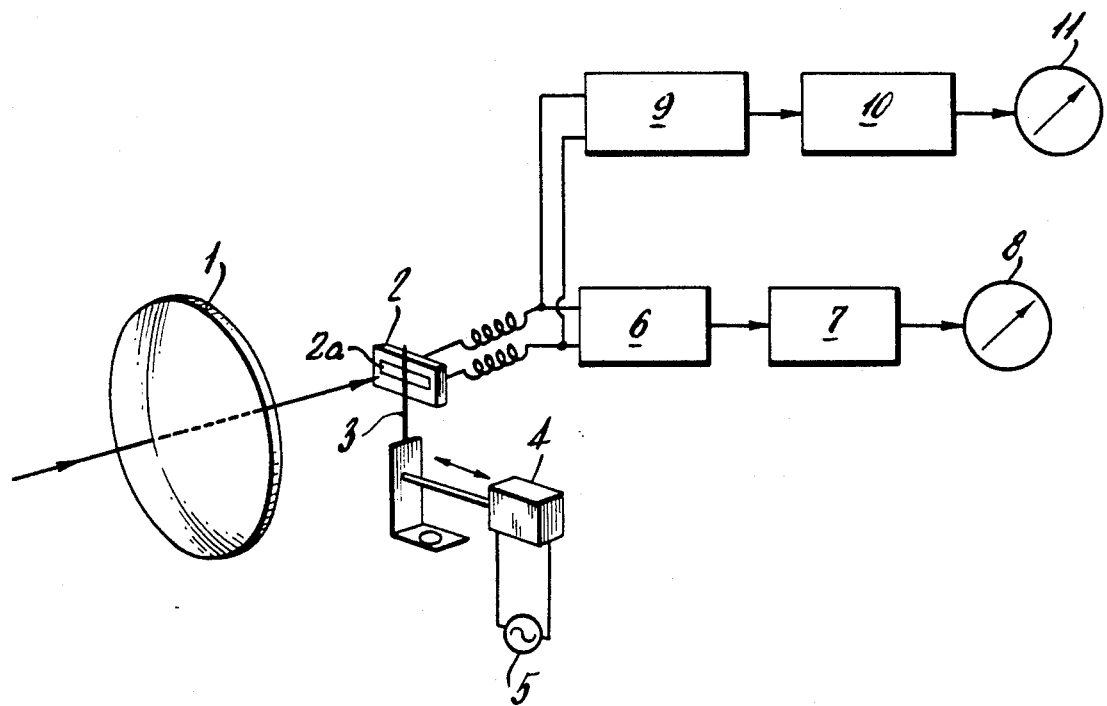
FIG. 1 is a fragmentary perspective view and block diagram of a mechanism embodying the present invention.

Referring now to the drawing which illustrates a preferred embodiment of the present invention, the reference numeral 1 generally designates an objective lens and 2 a photoelectric element disposed in or directly behind a predetermined focal plane of objective lens 1 and having a transversely extending elongated light receiving surface 2a and a scanning element or piece 3 consisting of an elongated or needle shaped light shielding or masking member is so constructed and supported as to be reciprocatable or oscillatable by a drive device 4 in a direction parallel to and lying in or proximate to the focal plane of objective lens 1 and transversely to the scanning element 3. The drive device 4 is energized by an oscillating electric power source 5.

A high-pass filter 6 is connected to and blocks the DC component of the output signal from photoelectric element 2 and passes the high frequency or alternating current component thereof. The high-pass filter may have a suitable gain and a gain control circuit may be provided for controlling such gain in accordance with the DC component of the signal from photoelectric element 2. A rectifier or detecting circuit 7 rectifies the AC signal output of the filter 6 into a DC signal whose level varies with the AC signal amplitude and is connected to a current meter 8 or other indicator which indicates the level of the DC output signal from rectifier 7.

A low-pass filter 9 is connected to the output of photo-electric element 2 and blocks the AC component of its output signal and passes the DC component. The output of low-pass filter 9 is connected through an amplifier 10 to a current meter 11 or other indicating device. Alternatively, the output of the amplifier 10 may be employed in a camera exposure control network.

Figure 2:
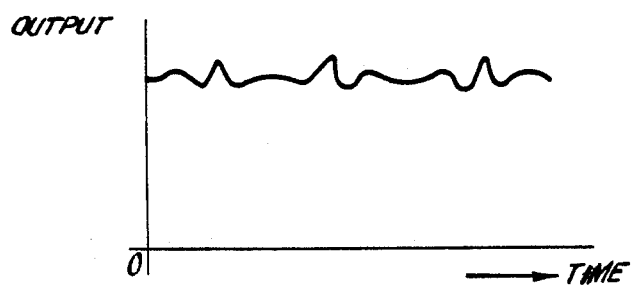
FIG. 2 is a graph indicating the variation of current with time in the photoelectric element of FIG. 1.

In the operation of the above described mechanism, assume that the objective lens 1 is axially moved back and forth relative to a given object and that, as a result, proper focussing is obtained in the position or plane of the oscillating scanning piece 3, then, a high frequency component of an AC signal obtained from the photoelectric element 2 will be maximized. The output signal is shown in FIG. 2. As shown, the output signal consists of a combination of a DC component with a superimposed AC component, so that as an image becomes sharper, the AC component sharply varies in its magnitude. Although this AC component is not such a video signal as can be obtained by scanning with a pin hole as in the conventional mechanism, the AC component comprises a signal corresponding to the contrast level. The signal from photoelectric element 2 is detected by means of the circuit 6 only for its high frequency component. In general, when the brightness of an object is high, a sharp contrast may be obtained for an object, while, if the brightness of the object is low, then the sharpness of contrast is lowered. The DC level of an output signal from the photoelectric element 2 is high when the brightness of an object scene is high, so that the gain of the circuit 6 is controlled so as to be reduced, and vice-versa. As a result, a high frequency output serving as a suitable contrast signal may be detected, irrespective of the brightness of the object. The output from the circuit 7 is converted into a contrast DC signal and is measured by the indicating means 8. Accordingly, proper focussing may be obtained by focussing for a maximum reading on the indicating means 8. It should be noted that the objective lens 1 may be automatically moved to its optimum position by using an output from the circuit 7 by utilizing known devices. The DC component of the photoelectric element output signal as shown in FIG. 2 represents an average of the illuminances of such a portion of an image formed through the objective lens 1 which corresponds to the light receiving surface 2a of photoelectric element 2. In other words, the aforesaid DC component represents the value of a TTL light measurement on the light receiving surface 2a. Accordingly, if the DC component is derived through the low-pass filter 9 and then introduced by way of amplifier 10 to the indicating means, then there is achieved a TTL light measurement on the light receiving surface 2a as well as a focus detection signal. As has been described earlier, a known exposure control may be effected by feeding an output from the amplifier 10 to an exposure control circuit.

As is apparent from the foregoing description, the provision of the image scanning member in the form of an elongated, needle shaped light shielding piece permits the use of a scanning member of compact size and reduced mass. In addition, the scanning device is further reduced in size due to the reduced size of a drive means for the scanning member and the required energy consumption is minimized. Furthermore, since the majority of the light receiving surface is not shielded, the DC component of the output from the light receiving element may be employed as a photographic light measurement, thus eliminating a need to separately provide a light measuring device for effecting the TTL light measurement.

The aforesaid advantages are derived from the fact that the scanning is effected by means of a small sized light shielding piece having an area smaller than the light receiving surface in which small shadow runs over the light receptive surface, rather than by means of a slit or pin hole provided in the light shielding plate covering the whole area of the light receiving surface of a photoelectric element in which spot beam runs over the light receptive surface. It should be appreciated that the light shielding piece according to the present invention is by no means limited to a needle shape, but may be of any shape insofar as it provides the aforesaid features of the present invention.

While there has been described and illustrated a preferred embodiment of the present invention, it is apparent that numerous alterations, omissions and additions may be made without departing from the spirit thereof.

We claim:
1. A mechanism for determining the focus condition of an image by an objective lens on a predetermined plane comprising a scanning needle element movable in said plane, means for repeatedly moving said needle element across a scan area delineating at least a part of said image in said plane, said needle element having a width which is a minor fraction of the dimension of said scan area in the direction of movement of said needle element, a photoelectric element exposed to said image as intercepted by said needle element and measuring means responsive to an electrical parameter of said photoelectric element varying with the movement of said needle element and the light incident on said photoelectric element for providing a signal indicative of said focus.

2. The mechanism of claim 1 wherein said measuring means is responsive to the alternating current component of the electrical signal derived from said photoelectric element.

3. The mechanism of claim 2 wherein said measuring means comprises a high-pass filter having an input coupled to said photoelectric element, a detecting circuit having an input connected to the output of said high-pass filter and current meter connected to the output of said detecting circuit.

4. The mechanism of claim 2 including second measuring means responsive to the direct current component of the electrical signal derived from said photoelectric element for providing a signal responsive to the overall light incident on said photoelectric element.

5. The mechanism of claim 4 wherein said second measuring means comprises a second current meter, and means including a low-pass filter connecting said second current meter to said photosensitive element.

6. The mechanism of claim 1 wherein said moving means oscillates said needle element in a direction transverse to the length thereof.

7. An image scanning device as set forth in claim 1, wherein a DC (direct current) component taken out of said scanning signal is used as a through-the-lens information.

8. An image scanning device for detecting a focussing condition by means of a scanning signal obtained by scanning an image formed through a lens, characterized in that the image is scanned by means of a photoelectric element and a light shielding needle element which shields a minor part of the light receiving surface of said photoelectric element.

* * * * *